United States Patent [19]
Barrault

[11] Patent Number: 4,604,576
[45] Date of Patent: Aug. 5, 1986

[54] ELECTROMAGNETIC DELAY LINE INCORPORATED IN A POSITION DETECTOR FOR A MOVABLE NUCLEAR REACTOR CONTROL ROD

[75] Inventor: Michel R. Barrault, Fontaine, France
[73] Assignee: Merlin Gerin, Grenoble, France
[21] Appl. No.: 474,193
[22] Filed: Mar. 10, 1983
[30] Foreign Application Priority Data Mar. 17, 1982 [FR] France ............................. 82 04665

[51] Int. Cl.⁴ .......................... G01B 7/14; G21C 7/00
[52] U.S. Cl. ..................................... 324/208; 376/258
[58] Field of Search ................. 324/207, 208; 73/313, 73/290 R, 304 R; 376/258

[56] References Cited

U.S. PATENT DOCUMENTS

| | | | |
|---|---|---|---|
| 3,296,862 | 11/1967 | Ziniuk | 73/290 R |
| 3,575,616 | 4/1971 | Jordan | 324/208 |
| 4,006,637 | 2/1977 | Kinosite | 324/208 |
| 4,071,818 | 1/1978 | Krisst | 324/208 |

FOREIGN PATENT DOCUMENTS 0022363 1/1981 Euorpean Pat. Off. .
1426892 6/1966 France .

OTHER PUBLICATIONS

IEEE Transactions on Nuclear Science, vol. NS-25, No. 1, Feb. 1978, New York, pp. 93-97.

Primary Examiner—Ernest F. Karlsen
Assistant Examiner—Walter E. Snow
Attorney, Agent, or Firm—Parkhurst & Oliff

[57] ABSTRACT

The invention concerns a position detector without mechanical contact. A permanent magnet attached to a mobile component co-operate with a sensor governed by the local action of the magnet. The sensor is constituted by an electromagnetic delay line having a saturable ferrite core onto which a winding propagating high frequency pulses is coiled. A reflectometer delivers the position indicator signal. The detector may be used to detect the position of a nuclear reactor control rod.

14 Claims, 12 Drawing Figures

ELECTROMAGNETIC DELAY LINE INCORPORATED IN A POSITION DETECTOR FOR A MOVABLE NUCLEAR REACTOR CONTROL ROD

BACKGROUND AND SUMMARY OF THE INVENTION

This invention concerns a device to detect the position of a mobile component moving in accordance with a preset course. More particularly the invention relates to a device for detecting the position of a nuclear reactor control rod, the device comprising a magnet attached to the mobile component and a sensor governed by the local action of the magnet and delivering a signal representing the position of the mobile component.

A known device of this kind comprises sealed tongue relays of the Reed type, which close at the approach of the permanent magnet attached to the rod and provide discrete data on the position of the rod. The failure of one of the relays generates an erroneous indication of the position of the rod and in order to avoid unwarranted shutdowns of the reactor it is necessary to multiply the number of detection devices and control and safety circuits. There is a relatively large number of conductors connecting the relays placed inside the reactor vessel to the processing units outside the reactor, thereby complicating the system as a whole.

It is an object of the invention to provide a detection device having a simple and reliable structure.

The sensor is constituted by an electromagnetic delay line lying at a short distance along the path of the magnet and comprising:
- a core of saturable magnetic material in conjunction with a winding propagating high frequency pulses;
- a generator connected to the input of the line to emit high frequency pulses;
- measuring means to detect local saturation of the core facing the magnet entailing a variation in the magnetic permeability of the core and a change in pulse propagation conditions in the winding;
- and processing means co-operating with the measuring means to generate the signal representative of the position of the mobile component.

The value of the load impedance Z of the delay line is judiciously chosen to establish standing wave conditions with variable reflection depending on the position of the magnet. Any configuration of the sensor is acceptable such as to constitute a coaxial, two-wire or single wire line.

The data on the position of the control rod is supplied directly by a reflectometer. This data is the result of either the ratio of the time taken for a pulse to be reflected back in the intermediate zone of the core saturated by the magnet to the time taken by a pulse reflected back at the end of the line, or the variation of the coefficient of reflection and/or of the standing wave ratio in relation to the position of the magnet.

The sensitivity of the sensor can be adjusted by concentrating the magnetic flux on the saturable zone of the core through the addition of pole-pieces or a magnetic circuit of predetermined form. It is also possible to modify the permeability of the core by injecting a bias current in the winding on the line.

The calibration of the distances of the sensor is obtained by dividing the core into several aligned elementary sections, delimited either by discontinuities or by zones saturated by means of auxiliary magnets.

BRIEF DESCRIPTION OF THE DRAWINGS

Other advantages and features will be clearly apparent from the following description of different embodiments of the invention, given as non-exhaustive examples, and illustrated in the attached drawings in which.

DETAILED DESCRIPTION OF THE PREFERRED EMBODIMENTS

On FIGS. 1 to 5, a permanent magnet, 10, attached to the end of a drive rod, 12, of a nuclear reactor control rod (not shown), is mounted so as to slide axially inside a non magnetic tube 14, that communicates with the core of the reactor. A sensor, identified by the general reference, 16, is placed outside tube 14 and detects the position of magnet 10 and provides an indication of the position of the control rod.

Figure 1:
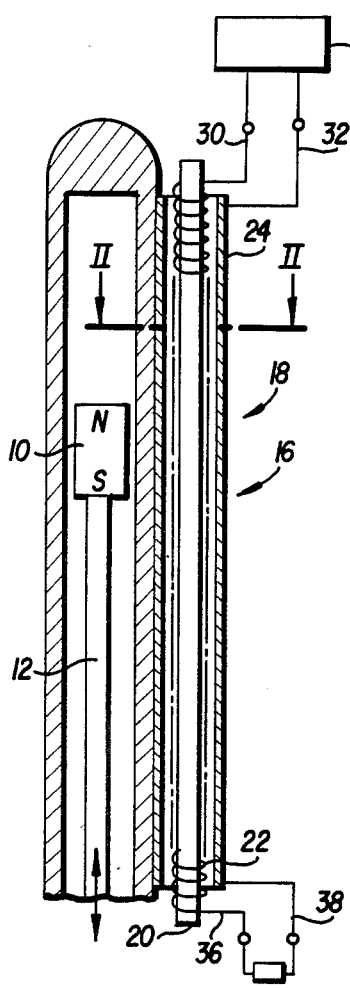
FIG. 1 is a schematic view of an axial cross-section through the detection device according to the invention.
Figure 2:
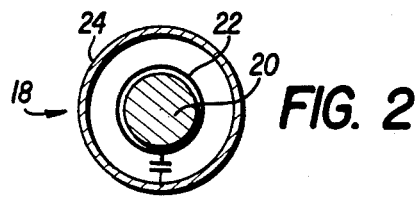
FIG. 2 shows an enlarged transverse cross-section of the sensor delay line according to FIG. 1.
Figure 3:
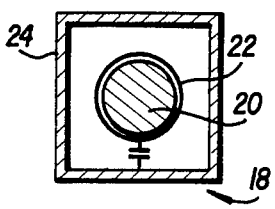
FIGS. 3 and 4 are views similar to FIG. 2 of two alternative embodiments.

Position detector 16 includes of an electromagnetic delay line, 18, extending along the axial sliding path of magnet 10, and being contiguous with the outer wall of tube 14 or at a predetermined radial distance from this wall. Delay line 18 comprises a rectilinear core, 20, of saturable magnetic material, onto which a winding, 22, is coiled that propagates a high frequency (HF) signal. Core 20 is a bar in ferrite or in another ferromagnetic material, the permeability of which varies with the magnetic field of magnet 10. Core 20, and winding 22 are housed inside casing 24 composed of a metal tube in non-magnetic, electrically conducting material. The complete assembly constitutes a coaxial line (FIG. 1 to 3) in which the central conductor formed by winding 22 is held in the axis of casing 24 by means of a dielectric holder. The cross-section of casing 24 may have any form, for instance cylindrical (FIG. 2) or rectangular (FIG. 3). The winding 22 propagating the high frequency signal is regularly coiled with turns touching or spaced.

Figure 4:
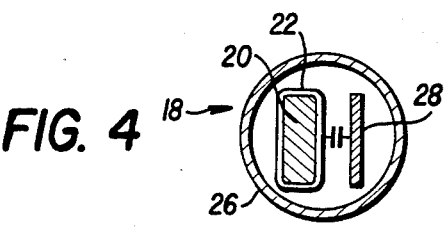

In the case illustrated in FIG. 4, line 18 is two-wire with rigid parallel conductors kept a constant distance apart inside a tubular housing, 26, in insulating material. One of the conductors is winding 22 placed on core 20 which can be of any cross-section, and the other conductor is constituted by a conducting bar, 28.

In another embodiment (not illustrated), line 18 is single wire. In this case, tube 14, housing drive rod 12 and magnet 10, takes the place of one of the line conductors.

Figure 5:
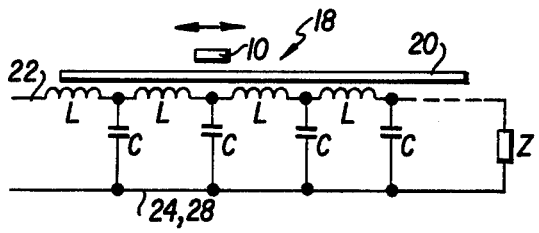
FIG. 5 illustrates the equivalent wiring diagram of the delay line according to the invention.

FIG. 5 illustrates the equivalent wiring diagram of line 18 with capacitance distributed along winding 22 so as to form a succession of elementary inductance (L) and capacitance (C) cells between the input and the output of line 18.

The input of line 18 is connected by means of linking conductors 30,32, to a reflectometer intended to send high frequency pulses in the line and to monitor the pulse propagation conditions in relation to the position of the mobile magnet, 10. On the opposite side to the reflectometer 34, line 18 is loaded by an impedance Z having a value different from but close to the characteristic impedance $Z_c$. Impedance Z is connected at the output of line 18 by linking conductors 36, 38. For the coaxial line shown on FIGS. 1 to 3, linking conductor pairs, 32, 38; 30, 36; are connected to opposite ends of casing 24 and winding 22, respectively. In the case of the two-wire line, FIG. 4, linking conductor pair 32, 38 is connected to the ends of return bar 28.

Reflectometer 34 comprises a generator of calibrated high frequency pulses of predetermined duration and repetition frequency. Under the standing wave conditions defined by the value of the load impedance Z of line 18, there is a reflection of the high frequency pulses emitted from the generator at all times. Measuring means incorporated in reflectometer 34 indicate the precise time elapsed between an out-going incident pulse and a returning reflected pulse. In an alternative embodiment, reflectometer 34 is constituted by a a generator of high frequency sustained waves, with a predetermined frequency sweep, cooperating with the measuring means of the coefficient of reflection and/or the standing wave ratio of line 18.

The position detector 16 as shown on FIGS. 1 to 5, operates as follows:

In the first stage, the correspondence between the electrical length and the physical length of line 18 is determined. The initial measurement of the electrical length of the line is taken without permanent magnet 10 and for a predetermined value of load impedance Z, able to establish standing wave propagation conditions. An outgoing pulse is reflected at the end of the line and the measurement of the time elapsed between emission and reception of the pulse serves to define the electrical length of line 18. Subsequently, the value of impedance Z will be kept for the measurement of the position of the control rod. Delay line 18 is then, in a second stage, exposed to the magnetic field of mobile magnet 10 associated with the two-directional travel of the reactor control rod. Permanent magnet 10 is axially magnetized in the displacement direction and can be flanked by two radial ferromagnetic pole-pieces, 40, 42, (FIG. 7) in order to concentrate and equalize the magnetic field in the saturable zone of core 20, placed opposite magnet 10. The configuration of magnet 10 may be different in that it may comprise one or several cylindrical studs with radial magnetization perpendicular to the displacement and to line 18.

The field of the permanent magnet induces local saturation of the ferrite core 20 in the zone opposite magnet 10. A variation in the magnetic permeability of core 20 occurs in this saturated zone situated between the input and the output of line 18, which results in partial reflection of the incident high frequency pulse emitted by reflectometer 34. Part of this incident pulse is consequently reflected in the saturated zone of core 22 and the other part crosses the intermediate saturated zone, propagating axially towards the end of line 18 where it is reflected. As a result, there are two reflected pulses each of which is returned to reflectometer 34 at a different time. The time-lag between the two reflected pulses is taken into account by the measuring and processing unit of reflectometer 34 which delivers a signal indicative of the position of magnet 10. This signal can be obtained in different ways depending on the kind of processing unit, in particular by means of the ratio of the outgoing and return time of the pulse reflected in the intermediate saturable zone to that of the pulse reflected at the end of line 18. Such a system assumes a line without losses and a practically constant propagation rate. An other processing system may be used to identify the position of the magnet based on the principle of the variation of the coefficient of reflection or of the standing wave ratio.

Figure 6:
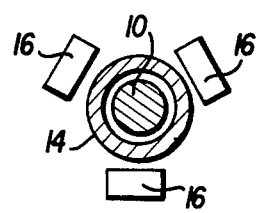
FIG. 6 is an alternative embodiment, showing three sensors in conjunction with one and the same control rod.

FIG. 6 is a schematic view of the layout of three sensors 16 distributed around the circumference of the non-magnetic tube 14 housing magnet 10.

Figure 7:
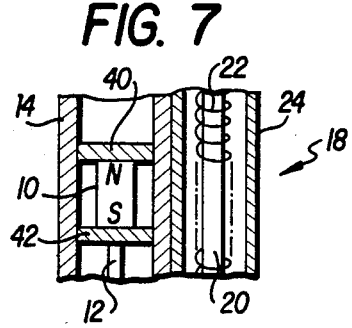
FIG. 7 is a partial view of FIG. 1 illustrating another embodiment.

The sensitivity of sensor 16 can be adjusted by concentrating the flux of magnet 10 in the saturable zone of core 20 in line 18 by the addition of a magnetic circuit of predetermined form, one example of which is illustrated in FIG. 7. Another means to this end would be to use an auxiliary generator (not shown) to inject a constant or variable d.c. bias current at the input of winding 22 in line 18.

By superposing this d.c. component on the high frequency pulse, the magnetic permeability of core 20 is modified over all its length bringing it close to saturation point.

Figure 8:
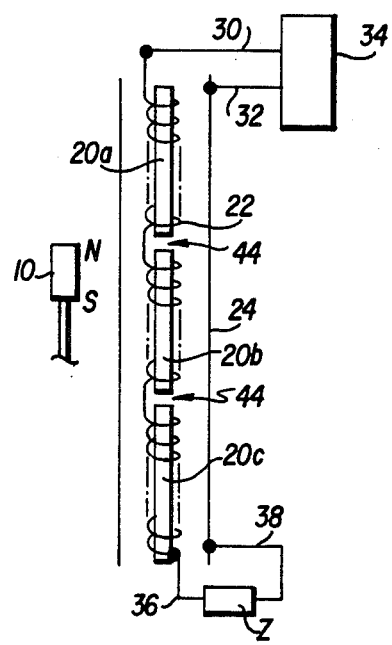
FIGS. 8 and 9 illustrate two other embodiments of the delay line in accordance with FIG. 1 and FIGS. 10 to 12 show part views of three other alternative embodiments.

Calibration of the distances is achieved by dividing the rectilinear core 20 into several elementary sections 20a, 20b, 20c, aligned along the axis of casing 24 (FIG. 8). As a result, the high frequency pulses are reflected at each discontinuity 44 provided between the different sections. In one embodiment illustrated in FIG. 9, there is a single ferrite core 20 and discontinuities 44 in FIG. 8 are replaced by zones saturated by means of auxiliary magnets 46, 48. This type of calibration is precise despite drift due to variations of temperature in sensor assembly 16.

The hollow casing 24 of delay line 18 is made from material with high thermal conductivity, such as copper, to ensure uniform temperature distribution over the length of line 18.

Figure 9:
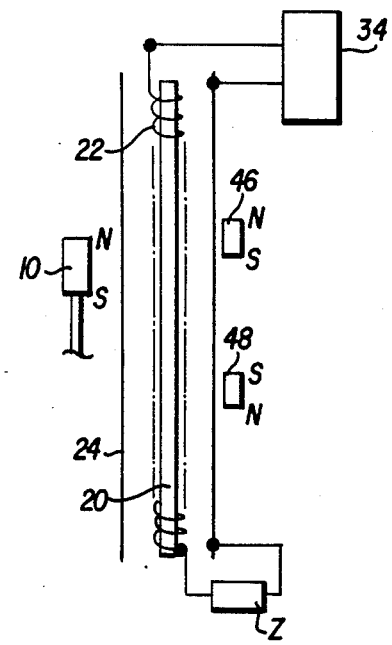

In an alternative embodiment shown in FIG. 9, core 20 is hollow in that it consists of a number of individual elementary ferrite tubes 200a, 200b, 200c ... or a single tube. Coaxial tubes 200a, 200b, 200c, all with identical structures, are aligned parallel to the displacement direction of magnet 10 and are placed end to end. Winding 22 consists of a central conductor 220 running through ferrite tubes 200a, 200b, 200c, and the assembly is housed in casing 24 which comprises an outer tube in non-magnetic, electrically conducting material.

Figure 11:
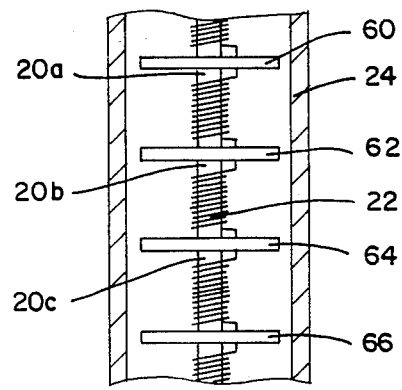

The high relative permittivity of ferrite can be used to lower the impedance and reduce the wave propagation rate on the line. One method (illustrated in FIG. 11) consists in coiling winding 22 directly onto rectilinear core 20 or onto the elementary sections 20a, 20b, 20c . . . of this core. Metal spacers 60, 62, 64, 66 . . . are inserted between the different sections 20a, 20b, 20c . . . and extend in the radial direction close to electrically conducting casing 24 in order to ensure earthing of the ferrite core. Improved concentration of the magnetic field of magnet 10 is obtained when spacers 60, 62, 64, 66 . . . are in ferromagnetic material.

Figure 10:
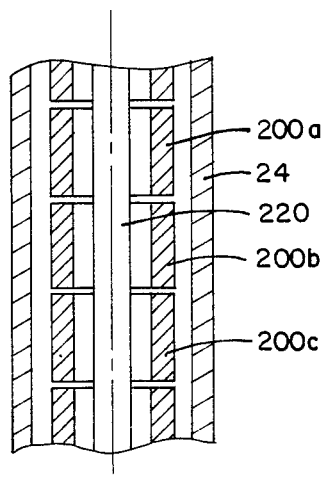
Figure 12:
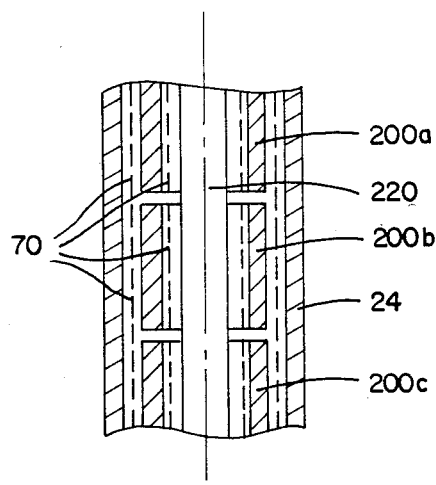

An alternative method (illustrated in FIG. 12) consists in using the elementary ferrite tubes 200a, 200b, 200 c . . . shown in FIG. 10 after spraying the inner and outer surfaces of these ferrite tubes with a metal coating (70).

What is claimed is:

1. A detection device for detecting the position of a movable nuclear reactor control rod, comprising:
   a permanent magnet attached to the movable control rod and slidable axially inside a non magnetic tube,
   a sensor governed by the local action of the permanent magnet for delivering a signal indicative of the position of the movable control rod, the sensor comprising an electromagnetic delay line located adjacent to and along the path of the magnet and including
   a rectilinear core of saturable magnetic material co-operating with a winding propagating high frequency pulses,
   a generator connected to the input of the delay line to emit high frequency pulses,
   measuring means for detecting local saturation of the core facing the permanent magnet, said saturation entailing a variation in the magnetic permeability of the core and a change in pulse propagation conditions in the winding, and
   processing means co-operating with the measuring means for generating a signal representative of the position of the control rod.

2. A detection device according to claim 1, wherein the core of magnetic material and the associated winding are placed inside a hollow metal casing of non-magnetic electrically conducting material, so as to constitute a coaxial delay line.

3. A detection device according to claim 1, wherein the winding coiled on the core, co-operates with an adjacent conductor to form a two-wire delay line placed in a housing of insulating material.

4. A detection device according to claim 1, wherein the winding lies along the core through which it runs or onto which it is coiled, and that the said high frequency generator and measuring and processing means constitute a reflectometer connected to the delay line, the opposite end of the line being loaded by an impedance of predetermined value able to establish standing wave conditions with variable reflection depending on the position of the magnet.

5. A detection device according to claim 4, wherein the reflectometer is arranged to furnish the ratio of the outgoing and return time of a high frequency pulse reflected in the intermediate zone of the core saturated by the magnet to that of a high frequency pulse reflected at the end of the line, said ratio representing the position indicator signal.

6. A detection device according to claim 1, wherein the magnet cooperates with pole-pieces or a magnetic circuit so as to concentrate the magnetic flux in the saturable zone of the core situated facing the magnet.

7. A detection device according to claim 1, wherein the delay line is connected to an auxiliary generator able to inject contant or variable d.c. bias current into the winding to enhance the sensitivity of the sensor.

8. A detection device according to claim 1, comprising a rectilinear ferrite core, wherein the calibration of the sensor distance is achieved by dividing the core into several aligned elementary sections delimited either by zones saturated by means of auxiliary magnets or by discontinuities.

9. A detection device according to claim 2, wherein the core is hollow and formed by a single tube of ferrite or by several elementary tubes placed end to end along the axis of the metal casing and that the winding is constituted by a central conductor going through the core.

10. A detection device according to claim 9, wherein the inner and outer surfaces of each elementary tube of the ferrite core are coated by means of a metallic layer.

11. A detection device according to claim 2, wherein the rectilinear core is divided into several sections and that metal spacers are provided between the different sections of the core so as to extend radially close to the non-magnetic, electrically conducting casing.

12. A detection device according to claim 1, wherein said winding cooperates with a return circuit constituted by the tube housing the permanent magnet, so as to form a single wire delay line, said tube being of non-magnetic and electrically conducting material.

13. A detection device according to claim 1, wherein the measuring and processing means include a device which detects a variation in the reflection coefficient of the high frequency pulses emitted by said generator so as to deliver a signal representative of the position of the magnet.

14. A detection device according to claim 1, wherein the measuring and processing means include a device which detects a variation of the standing wave ratio of said electromagnetic delay line so as to generate a signal representative of the position of the magnet.

* * * * *